(12) United States Patent
Grossmann

(10) Patent No.: US 6,622,600 B2
(45) Date of Patent: Sep. 23, 2003

(54) MACHINE TOOL

(75) Inventor: Walter Grossmann, Baltmannsweiler (DE)

(73) Assignee: Index-Werke GmbH & Co. KG Hahn & Tessky, Esslingen (DE)

( * ) Notice: Subject to any disclaimer, the term of this patent is extended or adjusted under 35 U.S.C. 154(b) by 0 days.

(21) Appl. No.: 09/925,030

(22) Filed: Aug. 8, 2001

(65) Prior Publication Data

US 2002/0020258 A1 Feb. 21, 2002

(30) Foreign Application Priority Data

Aug. 17, 2000 (DE) .......................................... 100 40 224

(51) Int. Cl.[7] .............................. B23B 7/00; B23B 3/30
(52) U.S. Cl. ........................................... 82/121; 82/129
(58) Field of Search .......................... 82/120, 118, 121, 82/129, 122; 29/36, 39, 40, 41

(56) References Cited

U.S. PATENT DOCUMENTS

| | | | | |
|---|---|---|---|---|
| 4,080,853 A | * | 3/1978 | Goto | ........................ 29/27 C |
| 4,457,193 A | * | 7/1984 | Matthey | ........................ 29/36 |
| 4,612,832 A | * | 9/1986 | Ushigoe et al. | ................ 29/36 |
| 4,953,274 A | * | 9/1990 | Rehage et al. | ............... 29/27 C |
| 5,946,992 A | * | 9/1999 | Ozawa | ........................ 82/118 |

FOREIGN PATENT DOCUMENTS

| | | | | |
|---|---|---|---|---|
| DE | 36 26 324 | | 2/1988 | |
| DE | 44 30 113 | | 2/1996 | |
| DE | 197 23 461 | | 12/1997 | |
| EP | 0 999 002 | | 5/2000 | |
| EP | 1180412 A2 | * | 2/2002 | ............ B23Q/1/01 |
| EP | 1275454 A1 | * | 1/2003 | ............ B23B/3/30 |
| GB | 2 159 450 | | 12/1985 | |
| GB | 2262061 A | * | 6/1993 | ............ B23B/3/30 |
| WO | WO 01/66289 | | 9/2001 | |

* cited by examiner

Primary Examiner—Willmon Fridie, Jr.
(74) Attorney, Agent, or Firm—Barry R. Lipsitz; Douglas M. McAllister

(57) ABSTRACT

In order to improve a machine tool comprising
a machine frame,
a first work piece spindle with a first work piece receiving means, a second work piece spindle with a second work piece receiving means which is arranged to face the first work piece receiving means, a first tool carriage disposed on one side of the first spindle axis and movable in the X direction in a position-controlled manner with a first tool carrier, for first tools in such a manner as to enable a work piece machining operation which is optimized with respect to the support sides, it is proposed that at least one further tool facing the second work piece receiving means is provided on the first tool carriage, that in order to conduct a machining operation of a work piece in the second work piece receiving means with the further tool simultaneously with a machining operation of a work piece in the first work piece receiving means with one of the first tools, the second work piece spindle is movable in X and Z direction, its position controlled by means of a machine control, and adapted to be able to follow the movement of the first tool carriage with a constant relative position, and in addition is movable relative to the first tool carriage in accordance with the provided machining operation of the work piece in the second work piece receiving means.

27 Claims, 8 Drawing Sheets

MACHINE TOOL

Figure 1:
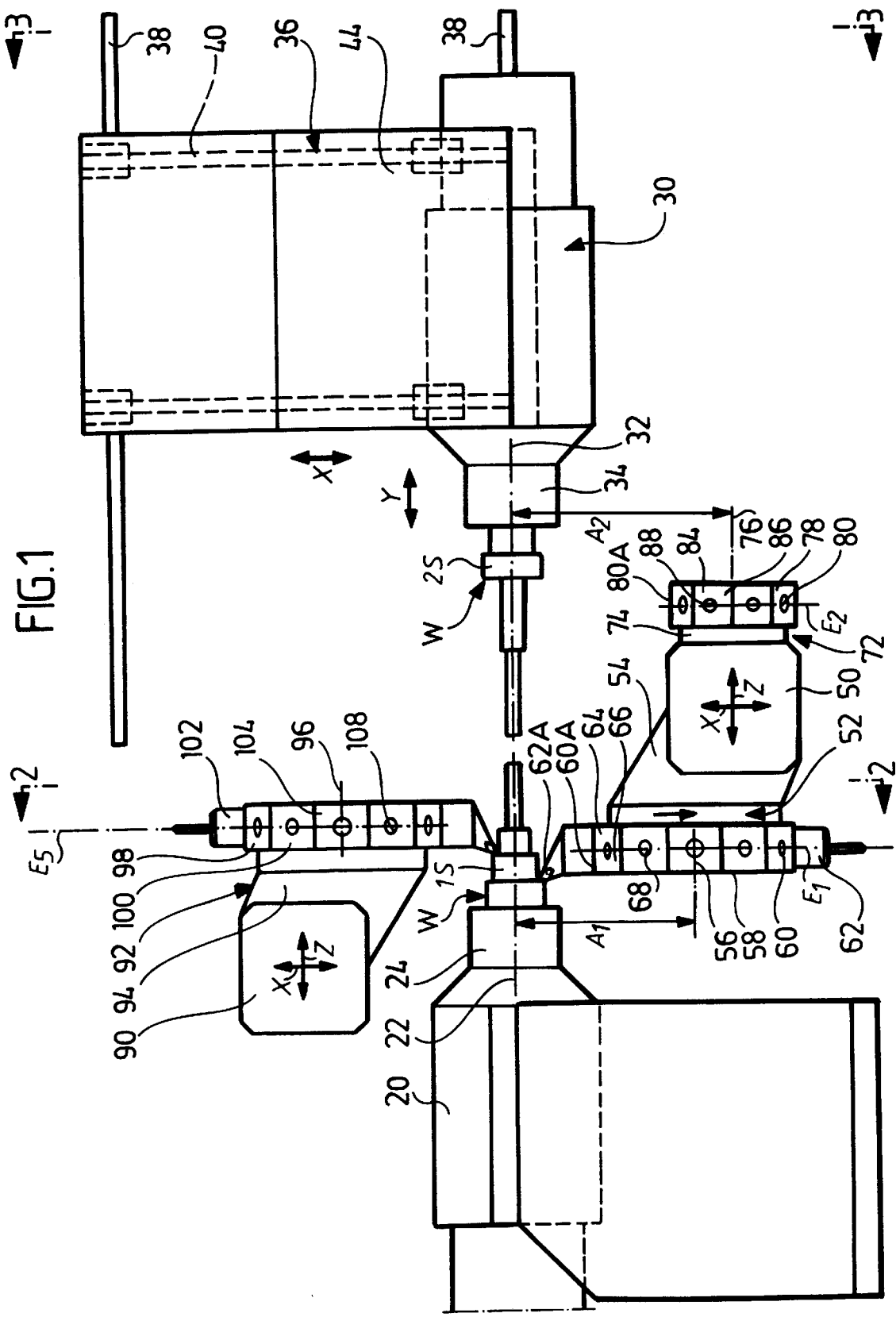

The present disclosure relates to the subject matter disclosed in German Application No. 100 40 224.0 of Aug. 17, 2000, the entire specification of which is incorporated herein by reference.

The invention relates to a machine tool comprising a machine frame, a first work piece spindle disposed on the machine frame with a first work piece receiving means rotatable around a first spindle axis, a second work piece spindle disposed on the machine frame with a second work piece receiving means rotatable around a second spindle axis, said second spindle being arranged to face the first work piece receiving means, whereby the second work piece spindle is movable in relation to the machine frame in a Z direction parallel to the first spindle axis and an X direction transverse to the first spindle axis, a first tool carriage disposed on the machine frame on one side of the first spindle axis and movable at least in the X direction, its position controlled by a machine control, said first tool carriage having a first tool carrier disposed thereon, in which first tools are disposed.

Such a machine tool is known from the prior art: with this machine tool the ability of the second work piece spindle to move in X direction transversely to the first spindle axis is utilized to conduct a machining operation on the reverse side in the second work piece spindle with an additional tool carrier so that a machining operation can be conducted on the front side with a work piece held in the first work piece receiving means, whereby sufficient space is available for said operation and, in addition, the work piece held in the first work piece receiving means can be supported, for example, by means of a tailstock.

The disadvantage of this solution is that optimum utilization of the machining possibilities cannot be achieved thereby.

Therefore, the object forming the basis of the invention is to improve a machine tool, in particular a lathe, of said type in such a way that an optimized work piece machining operation is possible with respect to the support sides.

This object is achieved according to the invention with a machine tool of the type described above in that at least one further tool is provided on the first tool carriage, that in order to conduct a machining operation of a work piece held in the second work piece receiving means with one of the first tools with the at least one further tool simultaneously with a machining operation of a work piece held in the first work piece receiving means, the second work piece spindle is movable, its position controlled by means of a machine control, and consequently may follow the movement of the first tool carriage with a constant relative position, and in addition is movable relative to the first tool carriage in accordance with the provided machining operation of the work piece held in the second work piece receiving means.

Therefore, the advantage of the solution according to the invention is that this permits a simultaneous machining operation of a work piece in the first work piece receiving means and a work piece in the second work piece receiving means, this being made possible by the first tool carrier and the further tool, both of which, however, are located on a joint tool carriage, and the necessary additional axial movement being achieved by appropriate control of the movement of the second work piece spindle, which must still be movable to be able to remove the work piece from the first work piece receiving means of the first work piece spindle for a machining operation on the reverse side with its second work piece receiving means.

This means that according to the invention a still present movability of the second work piece spindle may be utilized in order to simultaneously conduct a machining operation of a work piece on the first side and another work piece on the second side without further tool carriages, so that low production times result thereby with simple construction.

In order to obtain sufficient space for the machining of the work piece held in the second work piece receiving means in relation to the work piece held in the first work piece receiving means, it is preferably provided that the further tool occupying a working position is displaced towards the second work piece receiving means in relation to the first tool occupying a working position so that collisions between the work pieces themselves or the work pieces and a tool provided for the other work piece may be prevented.

A particularly preferred solution provides that a further tool carrier for the at least one further tool is disposed on the first tool carriage, which thus enables a sufficiently large distance to be created between the tools of the first tool carriage and the at least one further tool.

In addition, the tool carrier provides the possibility of moving the further tool into a working position or out of the working position so that further flexibility is obtained as a result.

No further details have been provided with respect to the arrangement of the first tool carrier and the further tool carrier in relation to one another in association with the explanation of the individual embodiments so far. Thus, it is particularly expedient if the further tool carrier is disposed on a side of the first tool carrier facing away from the first work piece spindle in order to have the further tools in a suitable position for a machining operation of a work piece held in the second work piece receiving means, while at the same time the first tools are available in a suitable position for a machining reformat operation of the work piece held in the first tool receiving means.

It is particularly favorable thereby if several further tools are provided which in a working position face the second work piece receiving means, while the first tools in a working position face the first work piece receiving means.

It would be fundamentally conceivable in the framework of the solution according to the invention to construct the first tool carriages to be movable only in X direction and to perform the Z movement necessary for the machining of the work piece in the first work piece receiving means by an ability of the first work piece spindle to move in Z direction, e.g. by a carriage.

However, a particularly expedient solution structurally provides that in addition to the X direction the first tool carriage is movable in a Z direction parallel to the first spindle axis in a manner controlled by the machine control.

No further details have been given so far with respect to the type of arrangement of the tools of the first tool carrier and of the further tool carrier in relation to one another relative to an X direction running transversely to the first spindle axis.

Thus, alternatively or in addition to the solution of the set problem described above, the object according to the invention is also achieved with a machine tool of the type described above in that the first tool carriage is provided with a further tool carrier, and that on the further tool carrier the further tool occupying a working position is at a greater distance from the first spindle axis in all positions of the first tool carriage than the first tool of the first tool carrier occupying a working position.

This solution has the great advantage that as a result of this changed positioning of the tool respectively occupying a working position, it was possible to conduct the machining of the work piece held in the second work piece receiving means with the further tool occupying a working position in a direction transverse to the first spindle axis, preferably displaced in X direction in relation to the machining of the work piece held in the first work piece receiving means.

It is particularly favorable thereby if the distance of the further tool occupying a working position from the first spindle axis is greater than the distance of the first tool occupying a working position from the first spindle axis by more than a maximum possible work piece diameter.

It is even better if this distance of the further tool occupying a working position from the first spindle axis is greater than the distance of the first tool occupying a working position from the first spindle axis by at least twice the maximum possible work piece diameter.

With this definition it is absolutely possible to perform a machining operation of the work piece held in the second work piece receiving means that is displaced in relation to the machining operation of the work piece held in the first work piece receiving means.

However, the aforementioned condition for performing the displaced machining operation may be met by the tool carriers being approximately the same size, but by the extension of the tools occupying a working position beyond the tool carrier being of different size in a direction transverse to the first spindle axis. However, this would necessitate using special tools at least either in the first tool carrier or the further tool carrier.

For this reason, a particularly favorable solution provides that a further tool receiving means of the further tool occupying a working position provided on the further tool carrier is at a greater distance from the first spindle in all positions of the first tool carriage than a first tool receiving means of the first tool occupying a working position provided on the first tool carrier.

This solution ensures that the further tool receiving means of the further tool occupying a working position is already at a greater distance from the first spindle axis than the first tool receiving means of the first tool occupying a working position, and therefore, in principle, the same tools may be used both in the first tool carrier and in the further tool carrier.

The distance of the further tool receiving means of the further tool occupying a working position from the first spindle axis is preferably greater than the distance of the first tool receiving means of the first tool occupying a working position by at least the maximum possible diameter of the work piece, and even better by at least twice the maximum possible diameter of the work piece.

No further details have been given with respect to the structure of the tool carriers in association with the explanation of the individual embodiments so far.

Thus, it would be conceivable within the framework of the solution according to the invention, for example, to construct the first tool carrier carrying several first tools as a linear tool carrier.

However, a particularly favorable solution for the use of several first tools provides that the first tool carrier has a head which can swivel around a first swivel axis in relation to a housing. Such a swiveling head can be a head which can swivel 90° or 180° in relation to the housing, for example. Such a swiveling head could also be combined with a linear tool carrier.

However, a solution which is particularly favorable for the use of as many first tools as possible provides that the head is a turret head, which is rotatable around a turret axis as swivel axis.

In the same way, the further tool carrier could also be a linear tool carrier, on which a plurality of further tools is disposed.

It is also particularly favorable here for the use of the further tools if the further tool carrier has a head which can swivel around a further swivel axis in relation to a housing, whereby this head may also be a head which can swivel 90° or 180°, for example.

However, it is particularly favorable for the use of a plurality of tools if the head is a turret head, which is rotatable around a turret axis as swivel axis.

If both the first tool carrier is a multiple tool carrier and the further tool carrier is a multiple tool carrier, then these are capable of being selected simultaneously. However, it is even more advantageous if the first tool carrier and the further tool carrier can be selected independently of one another in order to respectively bring one of the tools into working position.

In particular with the solution whereby a swiveling head is provided for receiving the tools, the aforementioned fixture of the distance of the tools from the spindle axis for displaced machining may be simply achieved by the further swivel axis being at a greater distance from the first spindle axis in every position of the first tool carriage than the first swivel axis so that the desired conditions may already be achieved by the arrangement of the swivel axes of on the first tool carriage.

A further possibility of creating the desired conditions with respect to the arrangement of the tools occupying a working position in relation to the first spindle axis provides that the head which can swivel around the further swivel axis has a smaller extension in the radial direction to the further swivel axis than the head of the first tool carrier which can swivel around the first swivel axis, so that the desired positioning of the tools occupying a working position in relation to the first spindle axis may likewise be already achieved by the radial extension.

A particularly favorable solution provides that both the swivel axes and the radial extension of the heads are selected simultaneously, as described above, in order to achieve the desired positioning of the tools at different distance from the first spindle axes.

Only the first tool carriage has been worked from in association with the explanation of the individual embodiments of the solution according to the invention so far.

It is particularly favorable, in particular in order to reduce the operating times by utilizing even more tools, if a second tool carriage with a second tool carrier is disposed on a side of the first spindle axis opposite the first tool carriage. This provides the possibility of working with a total of three tools simultaneously, in which case two tools are in use on one work piece and one tool is in use on the other work piece.

This second tool carrier can carry one tool in the simplest case. However, it is particularly favorable if the second tool carrier carries a plurality of tools.

No further details with respect to the movability of the second tool carrier have been given in association with the explanation of the individual embodiments so far. Thus, it would be conceivable, depending on the type of axes of movement provided for the first work piece spindle, that the second tool carrier is movable in X direction, its position controlled with the machine control, whereby in this case the first work piece spindle would have to be movable in a controlled manner in Z direction.

Another solution provides that the second tool carrier is movable in Z direction, its position controlled with the machine control.

However, a particularly favorable solution provides that the second tool carrier is movable in both X direction and in Z direction, its position controlled with the machine control, since this type of movability of the second tool carrier is favorably complemented by the movability of the first tool carrier likewise in X and Z direction, so that both tool carriers can be used to machine the work piece held in the first work piece receiving means.

Moreover, both tool carriers may, advantageously, also be used to machine the work piece held in the second tool receiving means, at least when the second work piece receiving means with the second spindle axis is disposed so that the second spindle axis is flush with the first spindle axis.

In this case, the construction of the second tool carrier can be achieved in accordance with the possibilities explained in association with the first tool carrier.

For example, the second tool carrier can also be constructed as a linear tool carrier.

However, it is particularly favorable if the second tool carrier also has a head which can swivel around a second swivel axis in relation to a second housing, whereby a particularly expedient solution provides that this head is a turret head, which is rotatable around a turret axis as swivel axis.

It has not been further discussed in association with the explanation of the embodiments so far whether an addition support of the work piece is necessary and how this should be achieved.

In particular when machining shaft parts with a machine tool according to the present invention, it has proved favorable if a movable tailstock, which is movable from an inactive position into an active position coaxial to one of the spindle axes into the working area, is disposed on the machine frame.

This solution has the great advantage that an additional support of the work piece is possible with such a tailstock in the case of shaft parts which either contributes to a higher precision and/or shorter machining times.

It is particularly favorable in this case if in its active position the tailstock is disposed coaxially to the first spindle axis, and thus serves to additionally support a work piece held in the first work piece receiving means.

No further details have been given with respect to the inactive position of the tailstock. Thus, it would be conceivable, for example, to also hold the tailstock in the region of the working area in the inactive position.

However, in order to prevent collisions, it is particularly favorable if the tailstock is disposed outside the working area in the inactive position.

It would be fundamentally conceivable thereby to dispose the tailstock on a carriage, for example, and to move it into the working area by means of a carriage.

However, another particularly favorable solution provides that the tailstock is held on a transfer means disposed essentially outside the working area, so that no substantial negative influence on the working area occurs as a result of the insertion of the tailstock.

It is particularly favorable thereby if the transfer means has an arm supporting the tailstock with which this may be moved into the working area, so that only an insignificant restriction of the machining possibilities occurs in the working area as a result of the tailstock moving into the working area.

It is particularly favorable thereby if the transfer means moves the tailstock from the active position into the inactive position or vice versa along a path running on a side of the first spindle axis lying opposite the first tool carriage, so that for the movement of the tailstock from the active position into the inactive position or vice versa a region of the working area is affected which enables the tailstock to move through the working area as far as possible free from collision.

Further features and advantages of the invention are the subject of the following description as well as the drawing of an embodiment with a variant.

Figure 2:
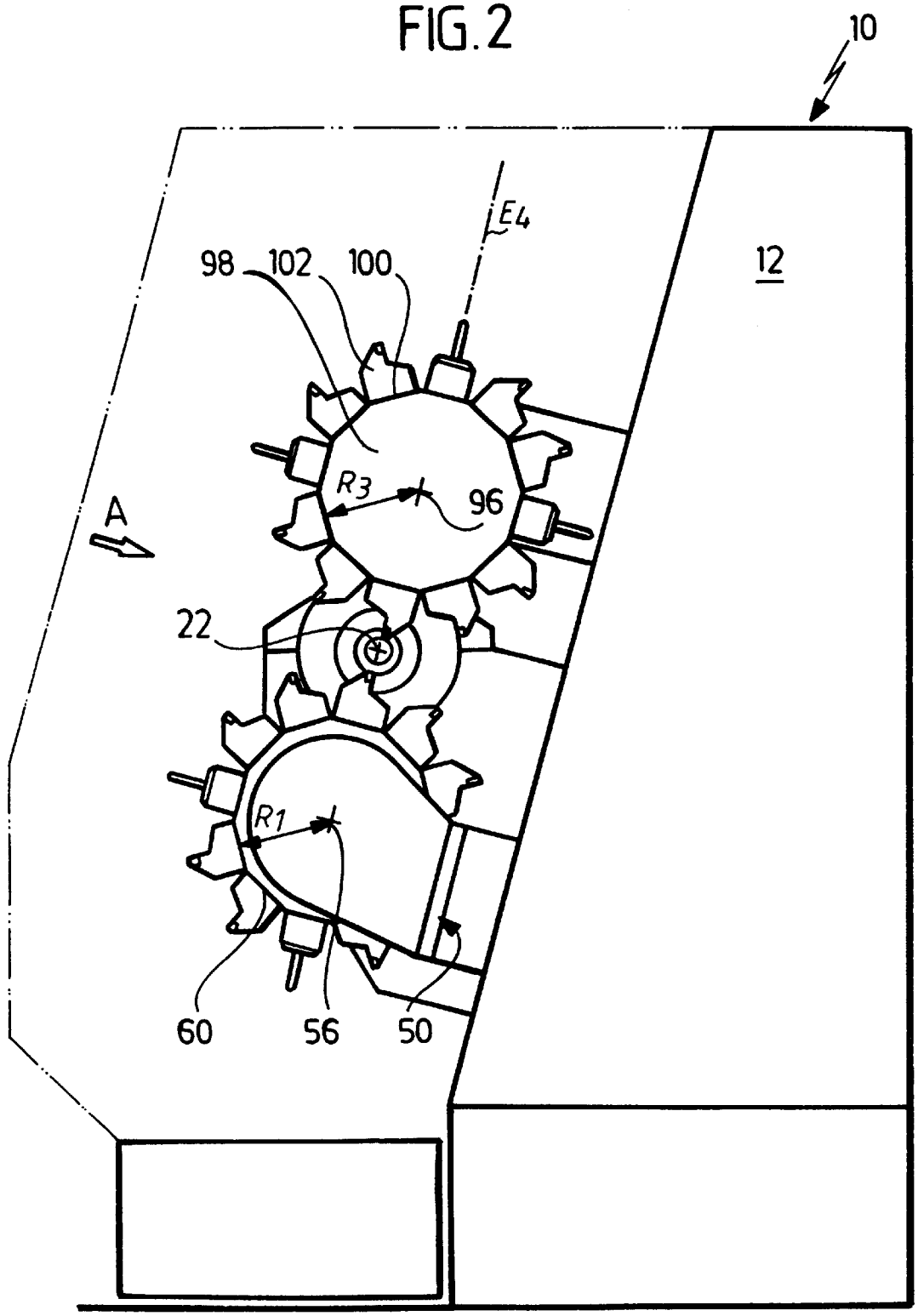
Figure 3:
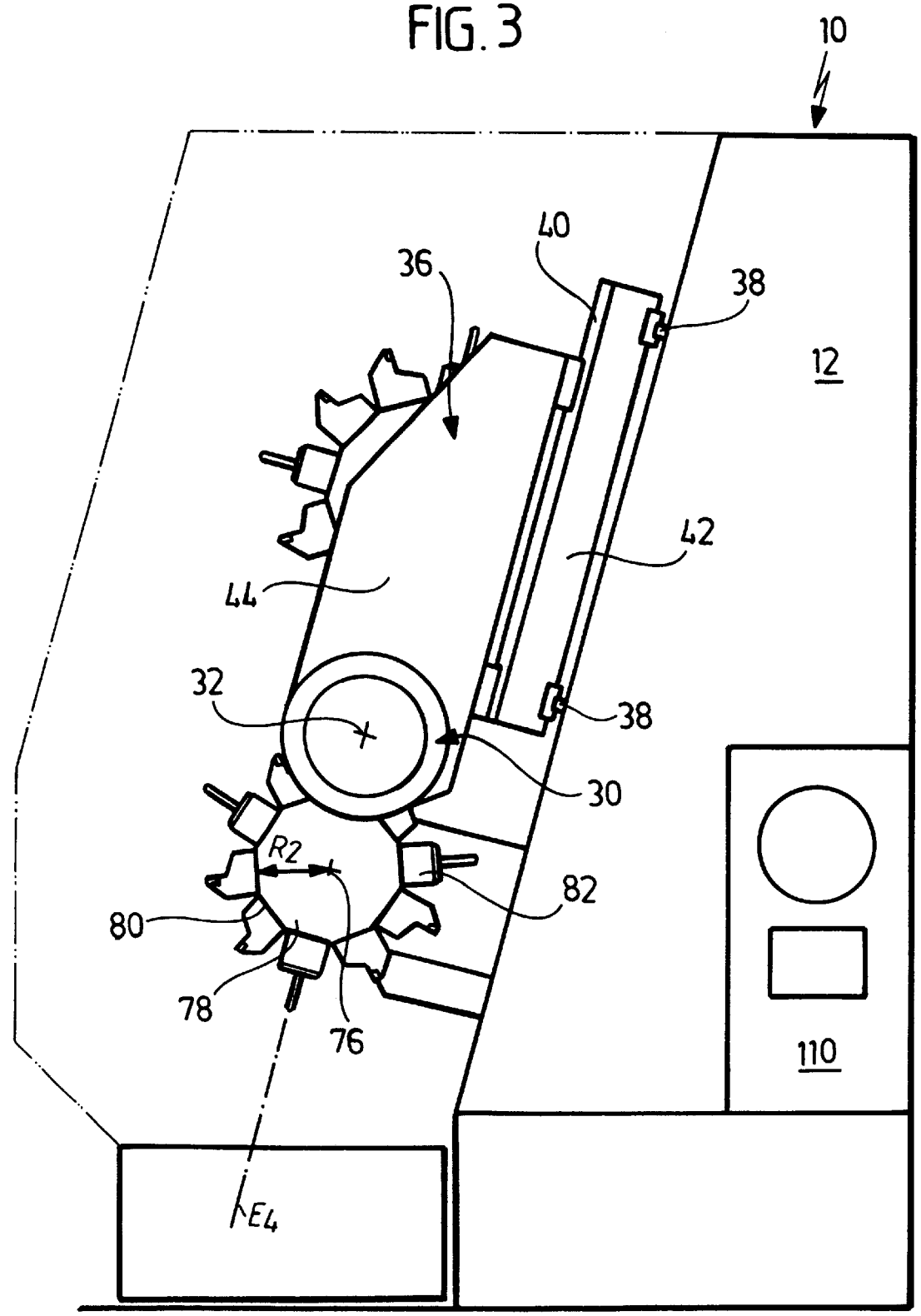
Figure 4:
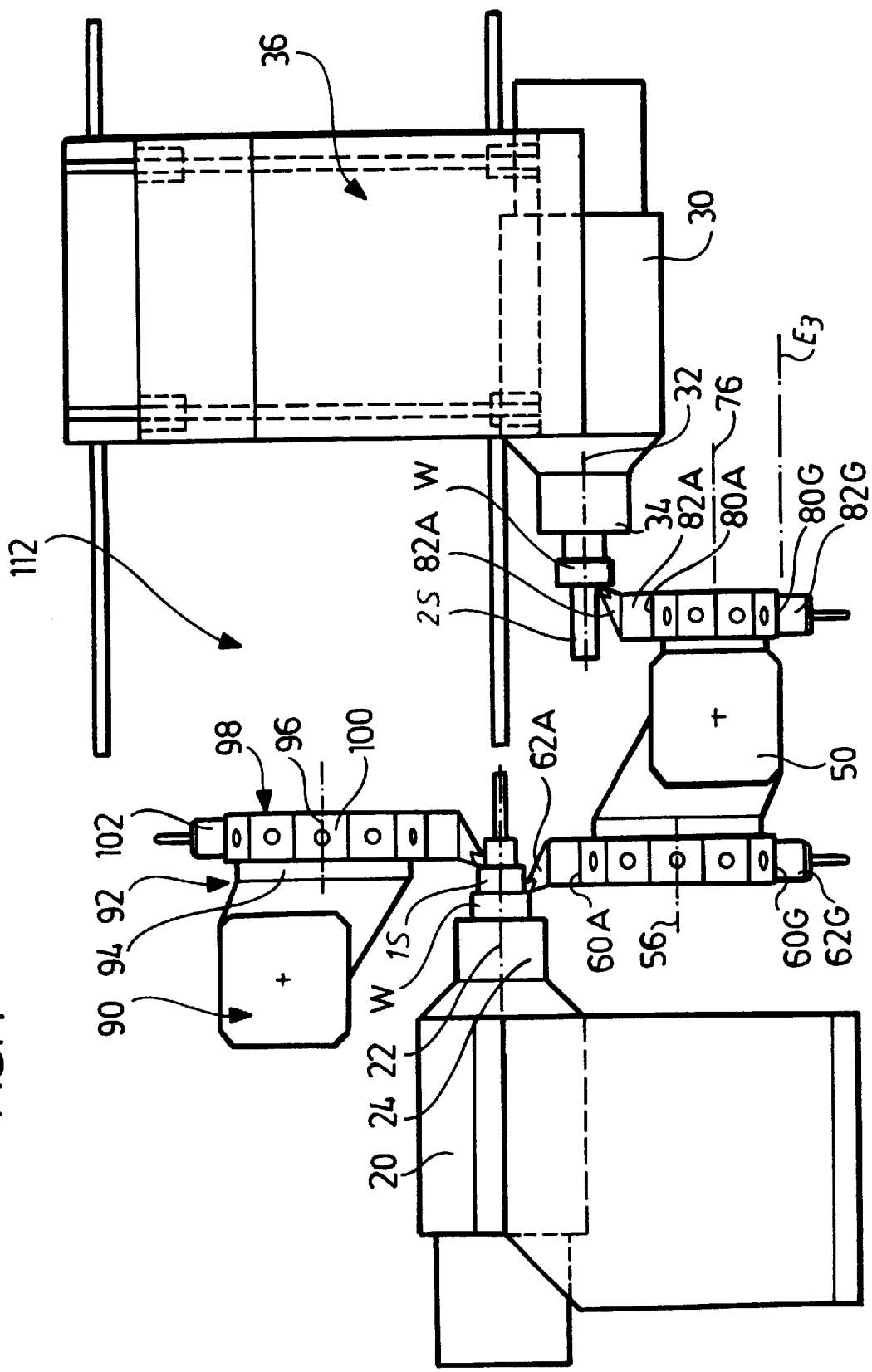
Figure 5:
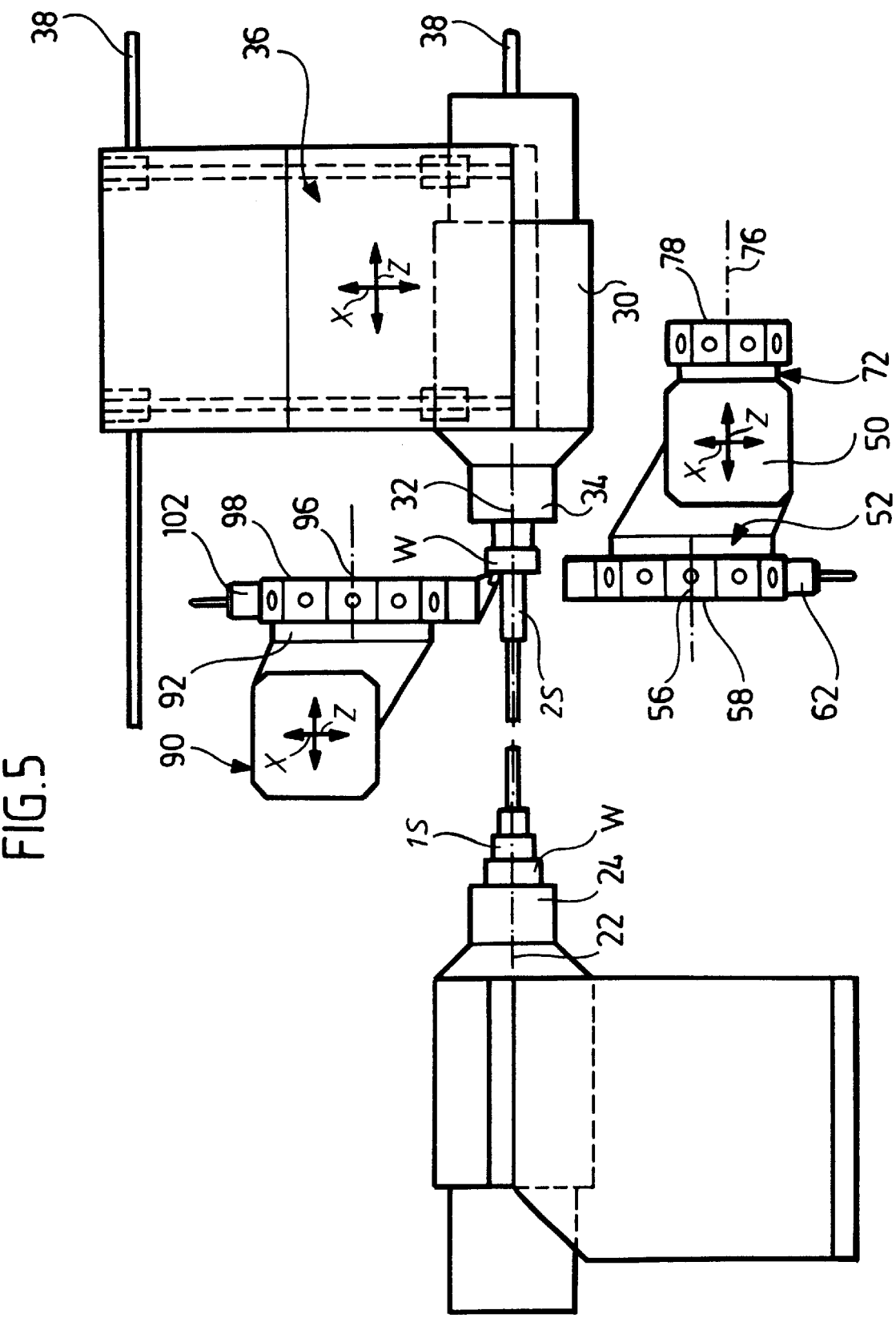
Figure 6:
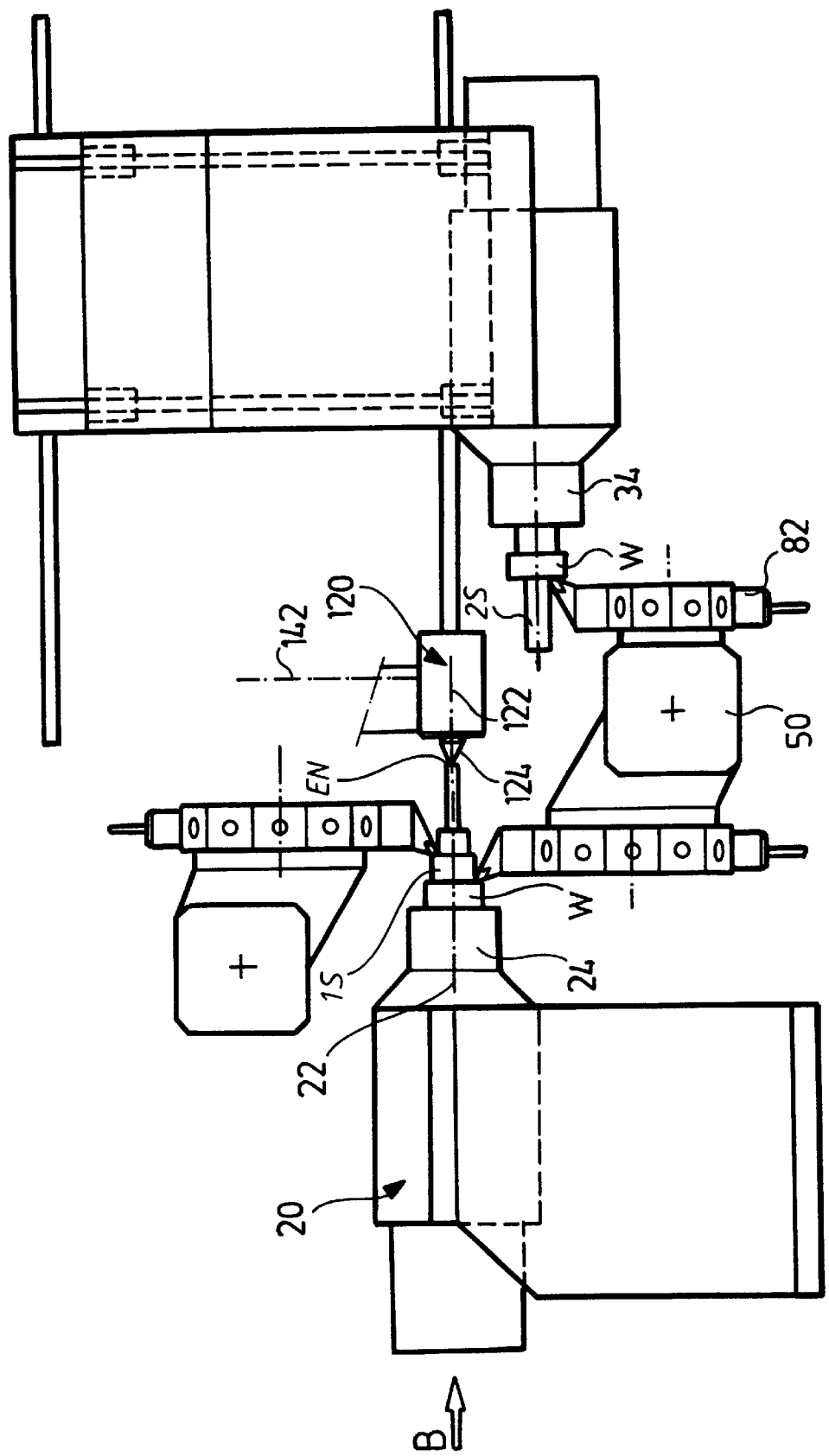
Figure 7:
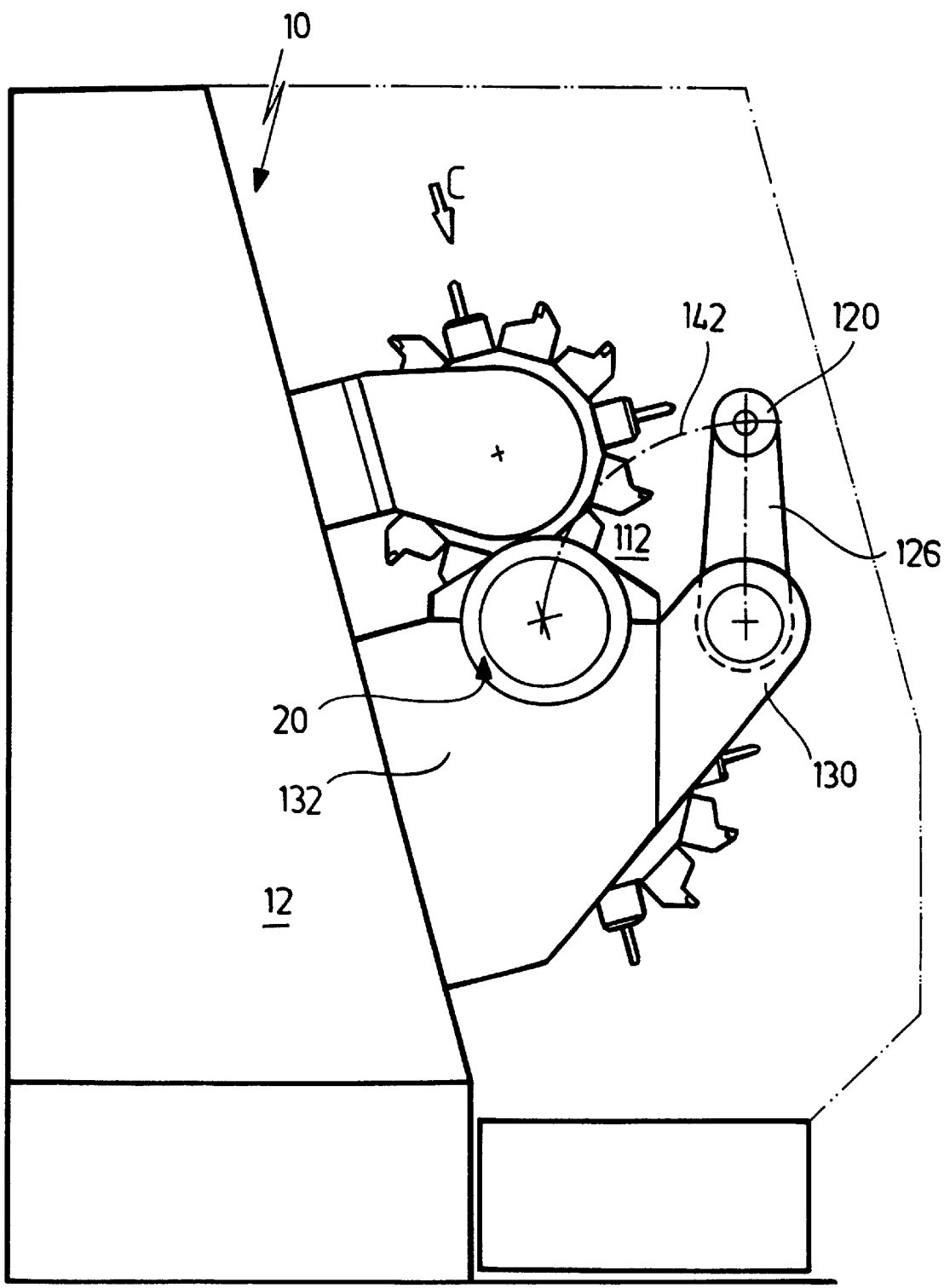

The drawing shows:

FIG. 1: a top view onto the embodiment of the machine tool according to the invention in the direction of arrow A in FIG. 2;

FIG. 2: a section taken along line 2—2 in FIG. 1:

FIG. 3: a section taken along line 3—3 in FIG. 1;

FIG. 4: a view in accordance with FIG. 1 representing a simultaneous machining operation of a work piece in a first work piece receiving means and of a further work piece in a second work piece receiving means by the machine tool according to the invention;

FIG. 5: a view in accordance with FIG. 1 with the machining of a work piece held in the second work piece receiving means with tools of a first tool carrier and a second tool carrier;

FIG. 6: a representation of a variant of the embodiment with the use of a tailstock;

FIG. 7: a view in the direction of arrow B in FIG. 6, and

Figure 8:
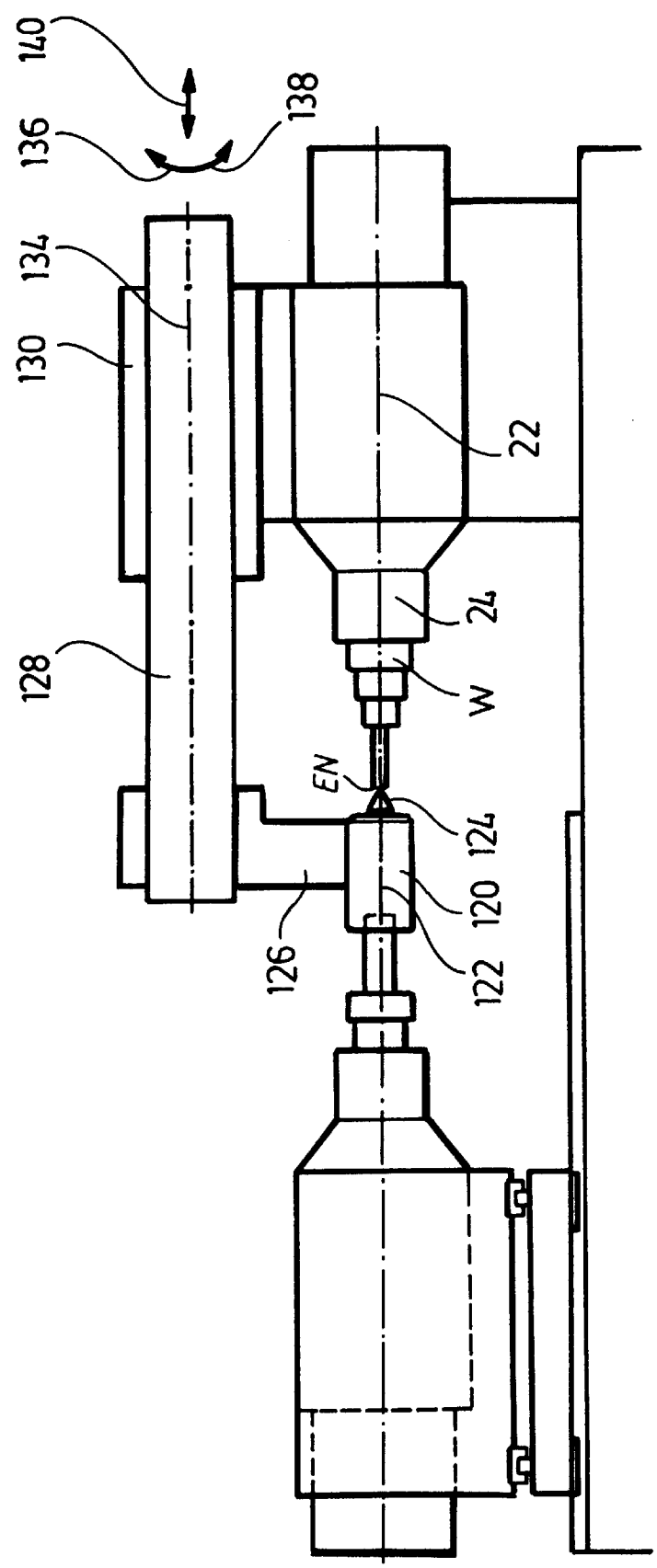

FIG. 8: a view in the direction of arrow C in FIG. 7, but the tool carriage is not shown.

As shown in FIGS. 1 to 3, an embodiment of a machine tool according to the invention comprises a machine frame 10 with a machine bed 12, on which a first work piece spindle 20 is fixedly disposed, which is provided with a work piece receiving means 24 rotatable around a first spindle axis 22, into said receiving means a work piece W may be inserted for machining on a first side 1S.

Moreover, a second work piece spindle 30 is disposed on the machine bed 12 to lie opposite the first work piece spindle, the second work piece receiving means 34 of said second work piece spindle which is rotatable around a second spindle axis 32 parallel to the first spindle axis 22 being disposed to face the first work piece receiving means 24, but at a distance from this.

The second work piece spindle 30 itself sits on a cross carriage, given the overall reference 36, which enables a movement of the second work piece spindle 30 in the direction of a Z direction running parallel to the spindle axes 22 and 32 and an X direction running perpendicular to the spindle axes 22 and 32, whereby preferably Z guide means 38 are disposed directly on the machine bed 12, whereas X guide means 40 of the cross carriage 36 are disposed on a Z carriage 42 of the cross carriage 36 disposed on the Z guide means 38 and themselves carry an X carriage 44 of the cross carriage 36 guided on the X guide means 40 guided in the X direction.

As a result, the second work piece spindle 30 may be brought into a position shown in FIG. 1, on the one hand, in which the second spindle axis 32 is flush with the first spindle axis 22, in order to take the work piece W machined on the first side 1S, for example, with the second work piece receiving means 34 from the first work piece receiving means 24, and thus permit a machining operation of the work piece W on a second side 2S which faces the first work piece receiving means 24.

Moreover, a first tool carriage 50, which is constructed as a cross carriage and is movable in the X direction perpendicular to the first spindle axis 22 as well as in the Z direction parallel to the first spindle axis 22, is provided on the machine bed 12 to machine the work piece W.

A first tool carrier, given the overall reference 52, is disposed on the first tool carriage 50. Said first tool carrier is constructed as a tool turret, for example, and has a first turret housing 54, which sits firmly on the first tool carriage 50 and on which a first turret head 58 rotatable around a first turret axis 56 is held, said first turret head being provided with a plurality of first tool receiving means 60, into which first tools 62 can be inserted.

The first tools 62 may be both internal and external machining tools. The first tool receiving means 60 in this case lie in a plane E1, which preferably runs perpendicular to the first spindle axis 22, while the first turret axis 56 is preferably aligned parallel to the first spindle axis 22.

Moreover, the first tool receiving means 60 sit on an outside periphery 64 of the first turret head 58 and preferably comprise end faces 66 forming the outside periphery 64 as well as plug-in holes 68 extending into the first turret head 58.

The first tool carrier 52 is preferably disposed so that it faces the first work piece spindle 20, whereby in particular the first turret head 58 sits on a side of the first tool carriage 50 facing the first work piece spindle 20.

Moreover, a further tool carrier 72 is disposed on the first tool carriage 50. This further tool carrier is likewise preferably constructed as a turret and has a further turret housing 74, which sits on the first tool carriage 50 and on which a further turret head 78 rotatable around a further turret axis 76, i.e. independently of the rotation of the first turret head 58, is disposed, this further turret head having further tool receiving means 80, into which further tools 82 can be inserted, as shown in FIG. 3, whereby the further tool receiving means 80 are disposed on an outside periphery 84 of the further turret head 78 and have end faces 86 forming the outside periphery 64 as well as plug-in holes 88. The further tools 82 can be both internal and external machining tools.

In the case of the further tool carriers 72 the further tool receiving means 80 also lie in a plane E2, which runs parallel to the plane E1 and thus likewise runs perpendicular to the first spindle axis 22.

However, the further turret head 78 with its further turret axis 76 is disposed relative to the first turret head 58 and its first turret axis 56 in such a way that the first turret axis 56 is at a distance A1 from the first spindle axis 22 which is smaller than a distance A2 of the further turret axis 76 from the first spindle axis 22.

Moreover, the first turret head 58 is constructed so that its first tool receiving means 60 are disposed at a radial distance R1 from the first turret axis 56, which is greater than a radial distance R2 of the further tool receiving means 80 from the further turret axis 76.

Thus, overall the first tool receiving means 60A of the first tool 62A occupying a working position lies respectively closer to the first spindle axis 22 than the further tool receiving means 80A occupying a working position of the corresponding further tool 82A occupying a working position, as shown in FIG. 4.

In addition, as a result of this arrangement of the first turret head 58 and the further turret head 78, preferably the tool receiving means 60G and 80G, which lie opposite the corresponding tool receiving means 60A or 80A occupying a working position, preferably lie close to a plane E3 which runs approximately parallel to the first spindle axis 22.

As a result, the same space requirement transversely to the first spindle axis 22 is constantly needed for the tools 62G and 82G inserted into these tool receiving means 60G and 80G, whereas the tools 62A and 82A occupying a working position enable a different positioning upon simultaneous machining of two different work pieces W. Thus, as shown in FIG. 4, the work piece W held in the first work piece receiving means 24 is positioned coaxially to the first spindle axis 22 and is machined by the first tool 62A occupying a working position, while the work piece W, which is held in the second work piece receiving means 34 and is rotatable around the second spindle axis 32, is positioned at a radial distance from the first spindle axis 22 in order to conduct a machining operation on this with the further tool 82A occupying a working position.

For this, the first spindle axis 22 and the first turret axis 56 as well as the further turret axis 76 and the second spindle axis 32 are preferably constantly disposed in a common plane E4, irrespective of the position of the first tool carriage 50 and the second work piece spindle 30.

In addition, as shown in FIGS. 1, 2, 4 and 5, a second tool carriage 90 is provided on the machine bed 12 which is likewise constructed as a cross carriage and is therefore movable relative to the machine bed 12 in X direction and Z direction.

The second tool carriage 90 itself carries a second tool carrier 92, which is likewise constructed as a turret and has a second turret housing 94 as well as a second turret head 98, which is rotatable around a second turret axis 96 on this second turret housing 94 and is likewise provided with second tool receiving means 100, into which second tools 102 can be inserted, whereby the tool receiving means 100 preferably lie in a plane E5 running perpendicular to the first spindle axis 22. The second tools 102 can be both internal and external machining tools.

The second tool receiving means 100 are also preferably disposed on an outside periphery 104 of the second turret head 98 and comprise an end face 106 forming the outside periphery 104 as well as a plug-in hole 108 extending into the second turret head 98.

The second tool receiving means 100 are preferably disposed at a distance R3 from the second turret axis 96 which is approximately equal to the distance R1, is preferably identical to this, so that the second turret head 98 can be constructed identically to the first turret head 58.

In this case, the second turret axis 96 also lies in the plane E4, irrespective of the position of the second tool carriage 90 relative to the machine bed 12.

With the machine tool according to the invention it is now possible to machine either the work piece W on the first side 1S with the first tools 62 and the second tools 102, if the work piece W is held in the first work piece receiving means 24, as shown in FIG. 1, or, as shown in FIG. 5, the work piece W on the side 2S with the first tools 62 and the second tools 102, if this work piece W is held in the second work piece receiving means 34 of the second work piece spindle 30, whereby in this case the second spindle axis 32 is preferably aligned coaxially to the first spindle axis 22. Such a machining operation is conducted, for example, after a transfer of the work piece W from the first work piece receiving means 24 into the second work piece receiving means 34.

In addition, it is also possible with the machine tool according to the invention, however, to simultaneously machine the work piece W on the first side 1S with the first tools 62 and the second tools 102, if the work piece W is held in the first work piece receiving means 24, whereby this machining operation occurs upon a rotation of the work piece W around the first spindle axis 22, however while also simultaneously machining a work piece W in the second work piece receiving means 34 on the second side 2S with the further tools 82, as is shown in FIG. 4.

For all these machining operations the machine tool according to the invention is provided with a machine control 110 indicated in FIG. 3, which controls the first work piece spindle 20, the second work piece spindle 30 as well as the cross carriage 36 for positioning of the second work piece spindle 30 relative to the first work piece spindle 20 and moreover the first tool carriage 50 and the second tool carriage 90 for relative positioning of the first tools 62, the second tools 102 and thus indirectly also the further tools 82 in precise position.

In this case, the control means 110 operates in such a manner that the first tool carriage 50 and the second tool carriage 90 are controlled in such a way in relation to the machine bed 12 that machining of the work piece W held in the first work piece receiving means 24 on the first side 1S can be conducted according to the desired machining processes.

Moreover, the machine control fundamentally controls the cross carriage 36 in such a manner that this, with respect to its movements in X direction and Z direction, synchronously follows the movements of the first tool carriage 50 in X direction and Z direction so that as starting basis the work piece W held in the second work piece receiving means 34 follows all the movements of the further tool 82A occupying a working position, and additionally such that a relative movement occurs between the further tool 82A and the work piece W held in the second work piece receiving means 34 in such a manner that the work piece W receives the prescribed contour in accordance with the desired machining process.

Thus, with the solution according to the invention there is the possibility of machining both the work piece W held in the first work piece receiving means 24 on the first side 1S with two tools 62 and 102 on 4 axes, i.e. with the X and Z axes of both tool carriages 50 and 90, and at the same time machining the work piece W held in the second work piece receiving means 34 on the second side 2S with a further tool 82A on 2 axes, this movement on two axes resulting from the cross carriage 36 not only synchronously following the movements of the first tool carriage 50 in X and Z direction, but additionally generating the relative movement between the work piece W and the tool 82A necessary for machining the work piece W on 2 axes with the further tool 82A.

The advantage of this solution is that a working area 112, in which tools 62, 82 and 102 move, can be of compact construction because of the possible displacement of the second spindle axis 32 relative to the first spindle axis 22 in the direction of the first tool carriage 50 during the machining of the work piece W held in the second work piece receiving means 34 by one of the further tools 82, so that a work piece W projecting far above the first work piece receiving means 24 in the direction of the first spindle axis 22 with its first side 1S, for example, cannot collide with the second side 2S of the work piece W in the second work piece receiving means 34 during machining of the same by tool 82A.

For the machining of the tool W held in the first work piece receiving means on one side 1S, a preferred variant of the described embodiment of the machine tool according to the invention, which is shown in FIGS. 6 to 8, also provides the support of same at its end EN facing away from the work piece receiving means 24 by a tailstock 120 with a seat 124 rotatable around an axis 122 for the end EN.

As shown in FIGS. 7 and 8, the tailstock 120 is thereby held on a swivel arm 126, for example, which is itself held on a shaft 128, which is in turn disposed in a shaft seat 130, in which case the shaft seat 130 could basically be located at any desired point of the machine bed. A particularly favorable solution provides that the shaft seat 130 sits on a bearing casing 132 for the first work piece spindle 20 and is supported via this on the machine bed 12 of the machine frame 10.

In the solution according to the invention, the shaft seat 130 supports the shaft 128 in such a manner that, on the one hand, this is rotatable around a shaft axis 134 in opposite directions of rotation 136 and 138 relative to the shaft seat 130 and, on the other hand, is displaceable in a direction of displacement 140 parallel to the shaft axis 134, whereby the direction of displacement 140 in turn preferably runs parallel to the first spindle axis 22 so that the tailstock 120 may be positioned in different Z directions relative to the first work piece receiving means 24 by displacing the shaft 128 in the direction 140 relative to the shaft seat 130 to be able to support the work piece W at its end EN, depending on the extension of the work piece W in the direction of the first spindle axis 22.

An active position is preferably provided for the tailstock 120, in which position the axis 122 of the seat 124 thereof is flush with the first spindle axis 22, thus enabling support of the end EN of the work piece W, the tailstock 120 being located in the working area 112 in this active position, whereas in an inactive position shown in FIG. 7 the tailstock 120 may be positioned outside the working area 112.

In this case, the tailstock 120 is movable by swiveling the shaft 128 in the directions of rotation 136 or 138 from the inactive position into the active position and vice versa, whereby the tailstock 120 moves along a circular path 142 between the active position and the inactive position.

The active position and the inactive position of the tailstock 120 are preferably prescribed in this case by end stops for the rotational movement of the shaft 128 around the shaft axis 134.

The advantages of the machining operation according to the invention of the work piece W held in the second work piece receiving means 34 for machining the second side 2S by means of the further tools 82 are particularly obvious with the use of the tailstock 120, since in this case the work piece W held in the second work piece receiving means 34 can be machined in a manner displaced laterally in relation to the first spindle axis 22 in the direction of the first tool carriage 50 and can thereby extend so far in Z direction towards the first work piece spindle 20 that this work piece W, at least in sections, extends parallel beside the tailstock 120, so that the working area 112 can be constructed to be extremely compact in Z direction.

For this, the circular path 162, along which the tailstock 120 is movable between the active and the inactive position, preferably runs transversely to the first spindle axis 22, i.e. on a side of the first spindle axis 122 lying opposite the first tool carriage 50, so that the tailstock 120 is movable at a distance from the second turret head 98 and approximately parallel thereto.

In addition to the functions described so far, the tailstock 120 in this variant of the embodiment can preferably be moved, likewise controlled by the machine control 110, between the active and the inactive position, the machine control 110 thereby controlling the rotation of the shaft 128 in the directions of rotation 136 or 138 and also the displacement of the shaft 128 in the direction of displacement 140.

What is claimed is:

1. Machine tool comprising:
   a machine frame,
   a first work piece spindle disposed on the machine frame with a first work piece receiving means rotatable around a first spindle axis,
   a second work piece spindle disposed on the machine frame with a second work piece receiving means rotatable around a second spindle axis, said second spindle being arranged to face the first work piece receiving means, whereby the second work piece spindle is movable relative to the machine frame in a Z direction parallel to the first spindle axis and an X direction transverse to the first spindle axis,
   a first tool carriage disposed on the machine frame on one side of the first spindle axis and movable at least in the X direction, its position being controlled by a machine at least one further tool arranged to face the second work piece receiving means is provided on the first tool carriage, in order to conduct a machining operation of a work piece held in the second work piece receiving means with the at least one further tool overlapping in time with a machining operation of a work piece held in the first work piece receiving means with one of the first tools, the second work piece spindle being movable, its position being controlled by means of a machine control, and adapted to be able to follow the movement of the first tool carriage with a constant relative position, and in addition being movable relative to the first tool carriage in accordance with the provided machining operation of the work piece held in the second work piece receiving means.

2. Machine tool according to claim 1, wherein the further tool being in a working position is displaced towards the second work piece receiving means in relation to the first tool being in a working position.

3. Machine tool according to claim 1, wherein a further tool carrier for the at least one further tool is disposed on the first tool carriage.

4. Machine tool according to claim 3, wherein the further tool carrier is disposed on a side of the first tool carrier facing away from the first work piece spindle.

5. Machine tool according to claim 1, wherein a plurality of further tools are provided which in a working position face the second work piece receiving means.

6. Machine tool according to claim 1, wherein in addition to the X direction the first tool carriage is movable in a Z direction parallel to the first spindle axis in a manner controlled by the machine control.

7. Machine tool according to claim 1, wherein said first tool carriage is provided with a further tool carrier for said at least one further tool, one of said at least one further tool on the further tool carrier when being in a working position is arranged at a greater distance from the first spindle axis in all positions of the first tool carriage than one of the first tools of the first tool carrier when being in a working position.

8. Machine tool according to claim 7, wherein the distance of the further tool when being in a working position from the first spindle axis is greater than the distance of the first tool when being in a working position from the first spindle axis by more than a maximum possible work piece diameter.

9. Machine tool according to claim 3, wherein a further tool receiving means for the further tools when being in a working position provided on the further tool carrier is at a greater distance from the first spindle in all positions of the first tool carriage than a first tool receiving means for the first tool when being in a working position provided on the first tool carrier.

10. Machine tool according to claim 1, wherein the first tool carrier has a head which can swivel around a first swivel axis in relation to a first housing mounted on said first tool carrier.

11. Machine tool according to claim 10, wherein the head is a turret head, which is rotatable around a turret axis as swivel axis.

12. Machine tool according to claims 7, wherein the further tool carrier has a head which can swivel around a further swivel axis in relation to a housing.

13. Machine tool according to claim 12, wherein the head is a turret head, which is rotatable around a turret axis as a swivel axis.

14. Machine tool according to claim 12, wherein the further swivel axis is arranged at a greater distance from the first spindle axis in every position of the first tool carriage than a first swivel axis of the first tool carrier.

15. Machine tool according to claim 12, wherein the head which can swivel around the further swivel axis has a smaller extension in the radial direction to the further swivel axis than a head of the first tool carrier which can swivel around a first swivel axis.

16. Machine tool according to claim 1, wherein a second tool carriage with a second tool carrier is disposed on a side of the first spindle axis opposite the first tool carriage.

17. Machine tool according to claim 16, wherein the second tool carrier carries a plurality of tools.

18. Machine tool according to claim 16, wherein the second tool carrier is movable in an X direction, its position controlled with the machine control.

19. Machine tool according to claim 14, wherein the second tool carrier is movable in a Z direction, its position controlled with the machine control.

20. Machine tool according to claim 1, wherein a movable tailstock, which is movable from an inactive position into an active position coaxial to one of the spindle axes into the working area, is disposed on the machine frame.

21. Machine tool according to claim 20, wherein the tailstock is disposed outside the working area in the inactive position.

22. Machine tool according to claim 20, wherein the tailstock is held on a transfer means disposed essentially outside the working area.

23. Machine tool according to claim 22, wherein the transfer means has an arm supporting the tailstock with which this may be moved into the working area.

24. Machine tool according to claim 22, wherein the transfer means moves the tailstock from the active position into the inactive position or vice versa along a path running on a side of the first spindle axis lying opposite the first tool carriage.

25. Machine tool comprising:
   a machine frame,
   a first work piece spindle disposed on the machine frame with a first work piece receiving means rotatable around a first spindle axis,
   a second work piece spindle disposed on the machine frame with a second work piece receiving means rotatable around a second spindle axis, the second work piece spindle being arranged to face the first work piece receiving means, the second work piece spindle being movable relative to the machine frame in a Z direction parallel to the first spindle axis and in an X direction transverse to the first spindle axis,
   a first tool carriage disposed on the machine frame on one side of the first spindle axis and movable at least in the X direction, its position being controlled by a machine control, said first tool carriage having a first tool carrier disposed thereon, on which first tools are disposed, said first tool carrier being adapted to swivel around a swivel axis in order to provide one of said first tools in a working position, the first tool carriage being provided with a further tool carrier, on which at least one further tool is disposed, said further tool carrier being adapted to swivel around a further swivel axis in order to bring said at least one further tool in a working position, said further swivel axis being arranged at a greater distance from the first spindle axis than the swivel axis of the first tool carrier.

26. Machine tool comprising:

a machine frame a first work piece spindle disposed on the machine frame with a first work piece receiving means rotatable around a first spindle axis, a second work piece spindle disposed on the machine frame with a second work piece receiving means rotatable around a second spindle axis, said second spindle being arranged to face the first work piece receiving means, whereby the second work piece spindle is movable relative to the machine frame in a Z direction parallel to the first spindle axis and an X direction transverse to the first spindle axis, a first tool carriage disposed on the machine frame on one side of the first spindle axis and movable at least in the X direction, its position being controlled by a machine control, said first tool carriage having a first tool carrier disposed thereon, on which first tools are disposed, at least one further tool arranged to face the second work piece receiving means is provided on the first tool carriage, in order to conduct a machining operation of a work piece held in the second work piece receiving means with the at least one further tool overlapping in time with a machining operation of a work piece held in the first work piece receiving means with one of the first tools, the second work piece spindle being movable, its position being controlled by means of a machine control, and adapted to be able to follow the movement of the first tool carriage with a constant relative position, and in addition being movable relative to the first tool carriage in accordance with the provided machining operation of the work piece held in the second work piece receiving means, a further tool carrier for the at least one further tool disposed on the first tool carriage, said further tool carrier having a head which can swivel around a swivel axis in relation to a housing.

27. Machine tool comprising:

a machine frame a first work piece spindle disposed on the machine frame with a first work piece receiving means rotatable around a first spindle axis, a second work piece spindle disposed on the machine frame with a second work piece receiving means rotatable around a second spindle axis, said second spindle being arranged to face the first work piece receiving means, whereby the second work piece spindle is movable relative to the machine frame in a Z direction parallel to the first spindle axis and an X direction transverse to the first spindle axis, a first tool carriage disposed on the machine frame on one side of the first spindle axis and movable at least in the X direction, its position being controlled by a machine control, said first tool carriage having a first tool carrier disposed thereon, on which first tools are disposed, at least one further tool arranged to face the second work piece receiving means is provided on the first tool carriage, in order to conduct a machining operation of a work piece held in the second work piece receiving means with the at least one further tool, the second work piece spindle being movable, its position being controlled by means of a machine control, and adapted to be able to follow the movement of the first tool carriage with a constant relative position, and in addition being movable relative to the first tool carriage in accordance with the provided machining operation of the work piece held in the second work piece receiving means.

* * * * *

UNITED STATES PATENT AND TRADEMARK OFFICE
CERTIFICATE OF CORRECTION

PATENT NO. : 6,622,600 B2
DATED : September 23, 2003
INVENTOR(S) : Grossmann

It is certified that error appears in the above-identified patent and that said Letters Patent is hereby corrected as shown below:

Column 11,
Line 17, after the word "machine" add -- control, said first tool carriage having a first tool carrier disposed thereon, on which first tools are disposed, --.
Line 65, after the word "the" add -- at least one --.
Line 65, delete the "s" at the end of the word "tools".

Column 12,
Line 30, change "carrier" to -- carriage --.
Line 33, change "carrier" to -- carriage --.

Signed and Sealed this

Fifth Day of April, 2005

JON W. DUDAS
*Director of the United States Patent and Trademark Office*